(12) United States Patent
Lin (10) Patent No.: US 8,488,454 B2
(45) Date of Patent: Jul. 16, 2013

(54) METHOD FOR ADJUSTING SIGNAL SPEED, MEDIA GATEWAY, AND MEDIA GATEWAY CONTROLLER

(75) Inventor: Yangbo Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 271 days.

(21) Appl. No.: 12/796,072

(22) Filed: Jun. 8, 2010

(65) Prior Publication Data

US 2010/0246601 A1 Sep. 30, 2010

Related U.S. Application Data

(63) Continuation of application No. PCT/CN2008/072822, filed on Oct. 24, 2008.

(30) Foreign Application Priority Data

Dec. 29, 2007 (CN) .......................... 2007 1 0306069

(51) Int. Cl.
*G01R 31/08* (2006.01)
(52) U.S. Cl.
USPC .......................................... 370/230; 370/252
(58) Field of Classification Search
USPC .......................................... 370/252, 401, 465
See application file for complete search history.

(56) References Cited

U.S. PATENT DOCUMENTS

| 2003/0009337 | A1* | 1/2003 | Rupsis ............................ 704/260 |
| 2003/0169751 | A1* | 9/2003 | Pulkka et al. .................. 370/401 |
| 2004/0101125 | A1* | 5/2004 | Graf et al. ...................... 379/229 |
| 2004/0136029 | A1 | 7/2004 | Zhang et al. |
| 2005/0021830 | A1 | 1/2005 | Urzaiz et al. |
| 2005/0283607 | A1* | 12/2005 | Zhang et al. .................. 713/170 |
| 2006/0198396 | A1 | 9/2006 | Chang et al. |
| 2008/0101338 | A1* | 5/2008 | Reynolds et al. ............. 370/352 |

FOREIGN PATENT DOCUMENTS

| CN | 1399446 A | 2/2003 |
| CN | 1557072 A | 12/2004 |
| CN | 1575574 A | 2/2005 |
| CN | 1706162 A | 12/2005 |
| CN | 1885837 A | 12/2006 |
| CN | 1885837 A | 12/2006 |
| EP | 1 128 610 A2 | 8/2001 |
| WO | WO 2004/110064 A1 | 12/2004 |
| WO | WO 2006/136070 A1 | 12/2006 |

OTHER PUBLICATIONS

First Chinese Office Action dated (mailed) Nov. 2, 2010, issued in related Chinese Application No. 200710306069.7 Huawei Technologies Co. Ltd.

(Continued)

*Primary Examiner* — Mark Rinehart
*Assistant Examiner* — Matthew Hopkins (57) ABSTRACT

The present invention relates to the communication filed and discloses a method for adjusting the signal speed, a media gateway (MG), and a media gateway controller (MGC). The method includes: receiving a command request that includes signal speed adjustment information from the MGC, and adjusting the signal speed according to the signal speed adjustment information. The MG includes a receiving module, an adjusting module, and a sending module. The MGC includes a sending module. In the present invention, the media gateway control protocol is extended to enable the MGC to adjust the speed of any signal.

8 Claims, 4 Drawing Sheets

OTHER PUBLICATIONS

Written Opinion of the International Searching Authority (translation) dated (mailed) Feb. 5, 2009, issued in related Application No. PCT/CN2008/072822, filed Oct. 24, 2008, Huawei Technologies Co., Ltd.

ITU-T "Series H: Audiovisual and Multimedia Systems Infrastructure of audiovisual services—Communication procedures Gateway control protocol: Version 3," T-REC-H.248.1-200509 Sep. 2005.

Extended European Search Report dated (mailed) Mar. 22, 2011, issued in related Application No. 08866995.7, PCT/CN2008072822, Hauwei Technologies Co., Ltd.

Schulzrinne, H., "Real Time Streaming Protocol 2.0 (RTSP) draft-ietf-mmusic-rfc2326bis-16.txt," The IETF Trust, Nov. 2007.

International Search Report from P.R. China in International Application No. PCT/CN2008/072822 mailed Feb. 5, 2009.

Examination Report of corresponding European Patent Application No. 08866995.7 , mailed Dec. 1, 2011, 7 pages total.

Office action issued in corresponding Chinese patent application No. 200710306069.7, Dated Feb. 29, 2012, and English translation thereof, 9 pages total.

\* cited by examiner

METHOD FOR ADJUSTING SIGNAL SPEED, MEDIA GATEWAY, AND MEDIA GATEWAY CONTROLLER

CROSS-REFERENCE TO RELATED APPLICATIONS

This application is a continuation of International Application No. PCT/CN2008/072822, filed on Oct. 24, 2008, which claims priority to Chinese Patent Application No. 200710306069.7, filed on Dec. 29, 2007, both of which are hereby incorporated by reference in their entireties.

FIELD OF THE INVENTION

The present invention relates to the communication field, and in particular, to a method for adjusting a signal speed, a media gateway, and a media gateway controller.

BACKGROUND OF THE INVENTION

The media gateway controller (MGC) and the media gateway (MG) are two key components on a packet network where services are separated from bearers. The MGC is responsible for service control, and the MG is responsible for media bearing so that the service control plane is separated from the media bearer plane. Thus, the network resources can be fully shared, the equipment upgrade and service expansion are simplified, and the development and maintenance costs are reduced.

Figure 1:
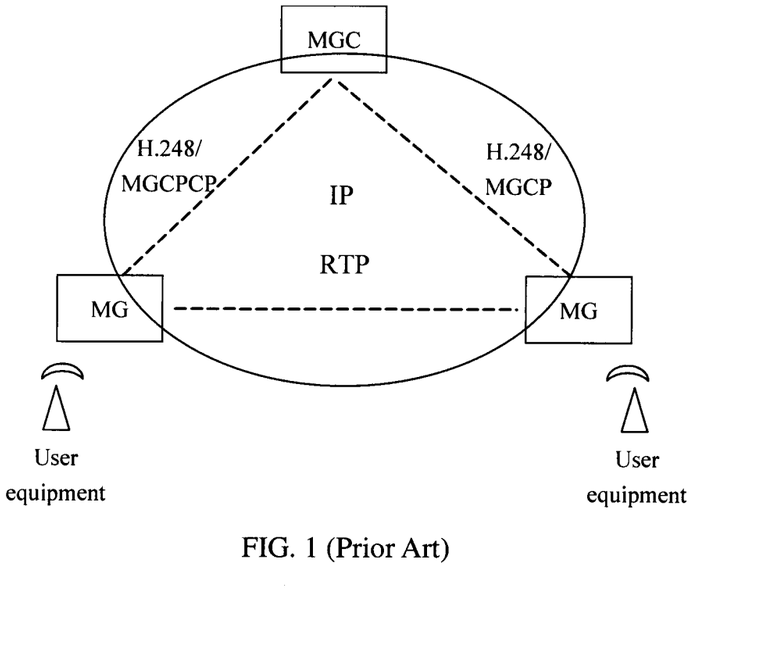
FIG. 1 is a schematic diagram illustrating the networking of an MGC and an MG in the prior art.

FIG. 1 illustrates the networking of an MGC and an MG. The MG communicates with the MGC over a media gateway control protocol. At present, the widely used protocols include the H.248/Gateway Control Protocol (MeGaCo) and Media Gateway Control Protocol (MGCP). In addition, H.248/MeGaCo is developed on the basis of MGCP.

Various resources on the MG are abstractly represented by terminations. The terminations are categorized into physical terminations and ephemeral terminations. Physical terminations represent some physical entities that exist semi-permanently, for example, a time division multiplexing (TDM) timeslot. Ephemeral terminations represent some public resources requested ephemerally and released after application, for example, a Real-time Transport Protocol (RTP) stream. In addition, a root termination is used to represent the entire MG. The correlations between terminations are abstractly represented by contexts. A context may include multiple terminations. Thus, a topology is used to describe mutual relationships between the terminations. A null context represents terminations that are not associated with other terminations.

In the prior art, the MGC instructs the MG to perform a resource operation through a signal, for example, playing and recording. A signal is executed on the termination or stream. If the signal is executed on the termination, the signal is applicable to all the streams on the termination. A signal list may be used to represent a series of operations that need to be performed in sequence. An interval may be available between each operation. The MGC adds the signal and/or signal list to a signal descriptor, and sends the signal descriptor to the MG. The signal and/or signal list in the signal descriptor sent at the same time is executed concurrently.

The signal execution duration on the MG is based on an earlier setting. In actual applications, this earlier setting may be adjusted. In the prior art, however, only the speed of the playing signal can be adjusted. For example, a preset segment of media may last 30 seconds at the default playing speed. In the media playing process, however, this segment of media may be required to last 45 seconds or be fast rewound to the beginning within 15 seconds, that is, it may be played in two ways at an adjusted speed relative to the default speed.

The prior art has at least the following weaknesses:

In the prior art, the signal execution duration can only be based on the earlier setting; during the signal execution, the MGC cannot adjust the speeds of signals other than the playing signal, thus failing to meet the instant adjustment requirement.

SUMMARY OF THE INVENTION

To enable the MGC to adjust the speed of any signal, embodiments of the present invention provide a method for adjusting a signal speed, a media gateway, and a media gateway controller. The technical solution provided in embodiments of the present invention is as follows:

A method for adjusting a signal speed includes:

receiving a command request that includes signal speed adjustment information from an MGC; and adjusting the signal speed according to the signal speed adjustment information.

An MG includes:

a receiving module, adapted to receive a command request that includes signal speed adjustment information from an MGC; and an adjusting module, adapted to adjust the signal speed according to the signal speed adjustment information included in the command request received by the receiving module.

An MGC includes:

a sending module, adapted to send a command request that includes signal speed adjustment information to an MG.

Embodiments of the present invention bring the following benefits:

In embodiments of the present invention, when the signal speed needs to be adjusted, the MGC sends a command request that includes the signal speed adjustment information to the MG; after receiving the command request, the MG adjusts the signal speed according to the signal speed adjustment information. In this way, the speed of any signal may be adjusted in real time.

DETAILED DESCRIPTION OF THE INVENTION

For better understanding of the objective, technical solution and merits of the present invention, the present invention is hereinafter described in detail with reference to the accompanying drawings.

In embodiments of the present invention, the media gateway control protocol is extended, so that the MGC can flexibly adjust the speed of any signal on the MG such as the playing signal and recording signal according to the actual need.

A method for adjusting the signal speed in an embodiment of the present invention includes the following steps:

The MG receives a command request that includes signal speed adjustment information from the MGC.

The MG adjusts the signal speed according to the signal speed adjustment information.

First Embodiment

The MG communicates with the MGC over a media gateway control protocol. At present, the widely used protocols include H.248/MeGaCo and MGCP. Taking H.248 as an example, in an abstract connection model between services and bearers, the interactions between the services and the bearers are actually operations on the terminations and contexts. Such operations are performed through command requests and replies between the MGC and the MG. Command types include: Add, Modify, Subtract, Move, AuditValue, AuditCapabilities, Notify, and ServiceChange. Command parameters, also known as descriptors, include Property, Signal, Event, and Statistic. For better description, parameters with service relevance are aggregated into a package logically.

In this embodiment, the media gateway control protocol is extended; a relative speed signal is introduced in the media gateway control protocol; the relative speed signal and its parameter are used to represent the signal speed adjustment information. The relative speed signal indicates a scale of the speed of the signal that the MGC requests to adjust to the regular speed.

The preceding relative speed signal is used to indicate a relative speed. For example, this signal may be named "relative speed (RS) signal". The RS signal may be defined in a prior package or a new package. If the RS signal is defined in a new package, the new package may be named "signal relative speed adjustment (SRSA) package".

The RS signal is an independent signal. To adjust the speed of a signal on a termination or a stream, the MGC does not need to reset the signal, but adds the RS signal to a signal descriptor, so that the signal speed adjustment may be performed on the termination or stream.

The RS signal may include the scale of the speed of the signal that the MGC requests to adjust to the regular speed. The scale is represented by a scale parameter. The value of the scale parameter may be positive or negative. A positive value indicates a forward speed, while a negative value indicates a rewind speed. The scale parameter type may be string, floating point, or integer. For example, when the parameter type is string or floating point, "1" indicates a forward speed that is equal to the regular speed; "2" indicates a forward speed that is twice the regular speed; "−1.5" indicates a rewind speed that is 1.5 times the regular speed. When the parameter type is integer, the value may be a percentage. "100" indicates a forward speed that is equal to the regular speed; "200" indicates a forward speed that is twice the regular speed; "50" indicates a forward speed that is half the regular speed; "−150" indicates a rewind speed that is 1.5 times the regular speed; "0" indicates pausing or may be defined as meaningless.

The RS signal may further include any combination of the following parameters:

(1) Signal identifier (SI), indicating the ID of a signal whose speed needs to be adjusted. The SI is a string in the format of package ID/signal ID. The SI may be set to adjust the speed of a single signal.

(2) Signal list identifier (SLI), indicating the ID of a signal list whose speed needs to be adjusted. The SLI is an integer. The SLI may be set to adjust the speed of a signal list (including a group of signals).

(3) Media resource identifier (MRI), indicating the ID of a media resource to be adjusted. The MRI is a string in the format of uniform resource identifier (URI) or internationalized resource identifier (IRI). When a termination or a stream has multiple instances of the same type of signal, these instances may be differentiated by the MRI.

Figure 2:
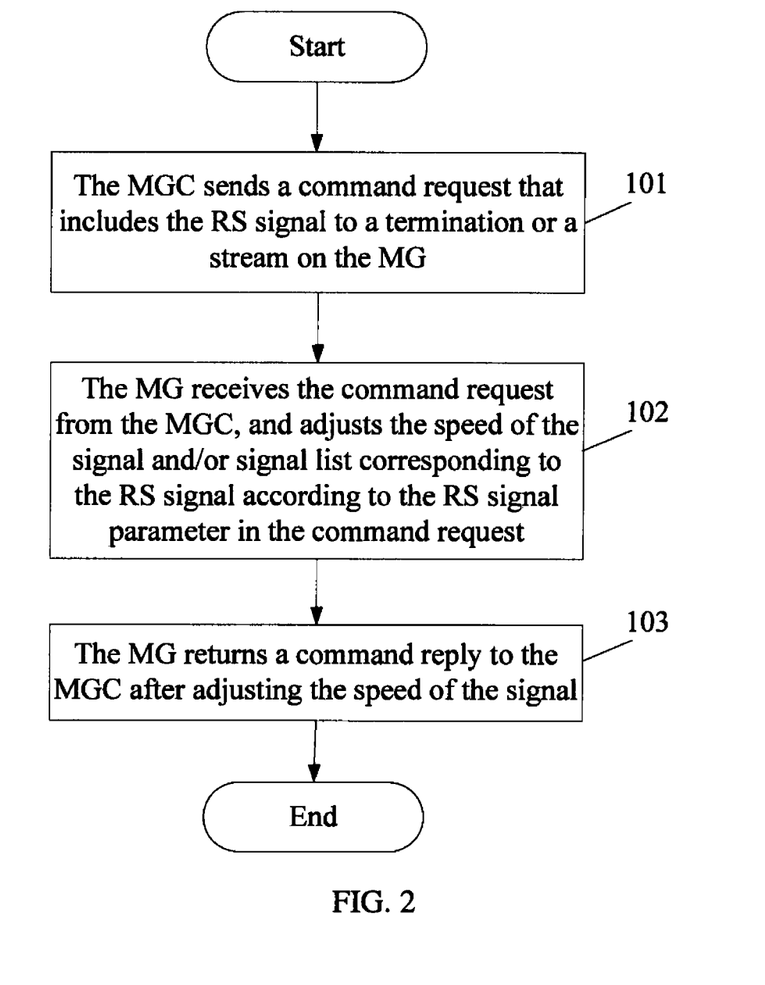
FIG. 2 is a flowchart of a method for adjusting the signal speed in a first embodiment of the present invention.

As shown in FIG. 2, a method for adjusting the signal speed in an embodiment of the present invention includes:

Step 101: When the MGC needs to adjust the speed of a signal, the MGC sends a command request that includes an RS signal to the corresponding termination or stream on the MG.

The MGC may send the RS signal through command requests such as Add, Modify, Move and Subtract, where the RS signal includes the scale parameter. The value of the scale parameter indicates the scale of the speed that the MGC requests to adjust to the regular speed. The default value may be defined as maintaining the current speed.

The RS signal may further include any combination of parameters such as SI, SLI, and MRI. The meanings of the combinations are as follows:

(1) If the RS signal sent from the MGC does not include a parameter such as SI, SLI, or MRI, the MG adjusts all the signals and/or signal lists on the termination or stream after receiving the command request.

(2) If the RS signal sent from the MGC includes the SI and/or SLI parameter, the MG adjusts the signal corresponding to the SI and/or the signal list corresponding to the SLI on the termination or stream after receiving the command request.

(3) If the RS signal sent from the MGC includes the MRI parameter only, the MG adjusts all the signals and/or signal lists associated with the media resource corresponding to the MRI on the termination or stream after receiving the command request.

(4) If the RS signal sent from the MGC includes the SI and/or SLI parameter and the MRI parameter, after receiving the command request, the MG adjusts the signal corresponding to the SI and/or the signal list corresponding to the SLI on the termination or stream, where the signal and the signal list are associated with the media resource corresponding to the MRI.

To prevent the case that the MG cannot keep the ongoing operation after the MGC sends the RS signal, the MGC may send a signal and/or a signal list corresponding to the RS signal while sending the RS signal, or preset the MG to reserve the signal and/or signal list automatically while adjusting the signal and/or signal list corresponding to the RS signal.

Step 102: The MG receives the command request from the MGC, and adjusts the speed of the signal and/or signal list corresponding to the RS signal according to the RS signal parameter in the command request.

When the MG adjusts the signal speed according to the RS signal parameter, the MG adjusts the speeds of all the signals and/signal lists on the termination or stream according to the scale parameter on the condition that the RS signal includes the scale parameter only, that is, the RS signal includes only the scale of the speed of the signal that the MGC requests to adjust to the regular speed; where the signals and/signal lists correspond to the command request. When the RS signal further includes at least one of the SI, SLI and MRI parameter, the MG adjusts the signal speed corresponding to the at least one of the SI, SLI, and MRI parameter according to the scale parameter. The detailed process is as follows:

(1) If the RS signal sent from the MGC does not include a parameter such as SI, SLI, or MRI, the MG adjusts the speeds of all the signals and/or signal lists on the termination or stream according to the scale parameter after receiving the command request.

(2) If the RS signal sent from the MGC includes the SI and/or SLI parameter, the MG adjusts the speed of the signal corresponding to the SI and/or the speed of the signal list corresponding to the SLI on the termination or stream according to the scale parameter after receiving the command request.

(3) If the RS signal sent from the MGC includes the MRI parameter only, the MG adjusts the speeds of all the signals and/or signal lists associated with the media resource corresponding to the MRI on the termination or stream according to the scale parameter after receiving the command request.

(4) If the RS signal sent from the MGC includes the SI and/or SLI parameter and the MRI parameter, after receiving the command request, the MG adjusts the speed of the signal corresponding to the SI and/or the speed of the signal list corresponding to the SLI on the termination or stream according to the scale parameter, where the signal and the speed of the signal list are associated with the media resource corresponding to the MRI.

In step 102, after the MG receives the command request from the MGC, the MG may further perform the following operations:

The MG judges whether at least one of the SI, SLI and MRI parameter included in the RS signal sent from the MGC matches the signal and/or signal list that corresponds to the command request on the termination or stream; if so, the MG adjusts the speed of the signal according to the RS signal and its parameter information; otherwise, the MG returns an adjustment execution error to the MGC. For example, if the signal corresponding to the SI and/or SLI does not exist or is already executed on the termination or stream, the MG returns an error reply to the MGC, for example, error code 473 (indicating conflicting property values).

Step 103: The MG returns a command reply to the MGC after adjusting the speed of the signal.

The command reply that the MG returns to the MGC includes an RS signal. The RS signal includes the scale parameter. The value of the scale parameter is the scale of the actual speed after the signal adjustment to the regular speed. The default value may be defined as the requested scale used in the adjustment. The MG reports the actual speed after adjustment to the MGC by using the scale parameter. This is because the MG may not adjust the signal speed in strict compliance with the scale requested by the MGC in practical applications. For example, if the value of the scale parameter is 2 in the command request sent by the MGC, it indicates that the speed of the signal needs to be adjusted to twice the regular speed. However, the speed of the signal adjusted by the MG may be only 1.8 times the regular speed. In this case, the value of the scale parameter in the command reply that the MG reports to the MGC is 1.8.

Further, if the MGC does not care about the actual speed after adjustment, the MG may not return a command reply to the MGC, that is, step 103 may be omitted, or the MG does not need to add the RS signal and the scale parameter to the command reply returned to the MGC.

In the preceding method for adjusting the signal speed, when the MGC sends a command request to the MG (downlink) and the MG returns a command reply to the MGC (uplink), a unified scale parameter is used. However, the meaning of the scale parameter in the command request is different from that in the command reply. An independent parameter may also be used to replace the scale parameter in the uplink or downlink command. For example, a requested scale and an actual scale are defined in the media gateway control protocol. The requested scale is the scale that the MGC sends to the MG, indicating the scale of the speed of the signal that the MGC requests to adjust to the regular speed. The actual scale is the scale that the MG reports to the MGC, indicating the scale of the actual speed of after the signal adjustment to the regular speed. The types and values of the requested scale and the actual scale are the same as those of the scale parameter, and are not further described.

If independent parameters are used, the RS signal in the command request that the MGC sends to the MG in step 101 may include the preceding requested scale parameter, and the default value of the parameter may be defined as maintaining the current speed. When the MGC wants the MG to return the actual speed after the signal adjustment, the RS signal may further include the preceding actual scale parameter. However, the value of the actual scale parameter is "CHOOSE" or wildcard "$", indicating that MGC wants the MG to return the actual speed of the signal after adjustment. In the command reply that the MGC returns to the MGC in step 103, the RS signal may also include the preceding actual scale parameter and the default value of the parameter may be defined as the used requested scale.

In this embodiment, an RS signal is introduced in the media gateway control protocol, which enables the MGC to flexibly adjust the speed of any signal according to the actual need. In addition, the RS signal is an independent signal. Thus, the signal speed may be easily and efficiently adjusted in real time.

Second Embodiment

In this embodiment, the media gateway control protocol is extended; a relative speed scale property is introduced in the media gateway control protocol, and the property is used to indicate the signal speed adjustment information. The relative speed scale property indicates the scale of the adjusted speed of the signal to the regular speed.

For example, the property is named "relative speed scale (RSS)". The RSS property may be defined in a prior package or a new package. If the RSS property is defined in a new package, the new package may be named "SRSA package".

The RSS property plays the same role as the scale parameter in the first embodiment. The type and value of the RSS property are also the same as those of the scale parameter and are readable and writable. When the RSS property is sent from the MGC to the MG, the RSS property indicates the scale of the speed that the MGC requests to adjust to the regular speed. The default value may be defined as maintaining the current speed. When the RSS property is returned from the MG to the MGC, the property indicates the scale of the actual speed of after the signal adjustment to the regular speed, and the default value may be defined as the used requested scale.

When the RSS property is used to adjust the signal speed, the RSS property is used in the TerminationState descriptor or the LocalControl descriptor according to whether the RSS property is used on the termination on the MG or on a stream on the termination, indicating that the speeds of all the signals on the termination or the stream are adjusted.

Figure 3:
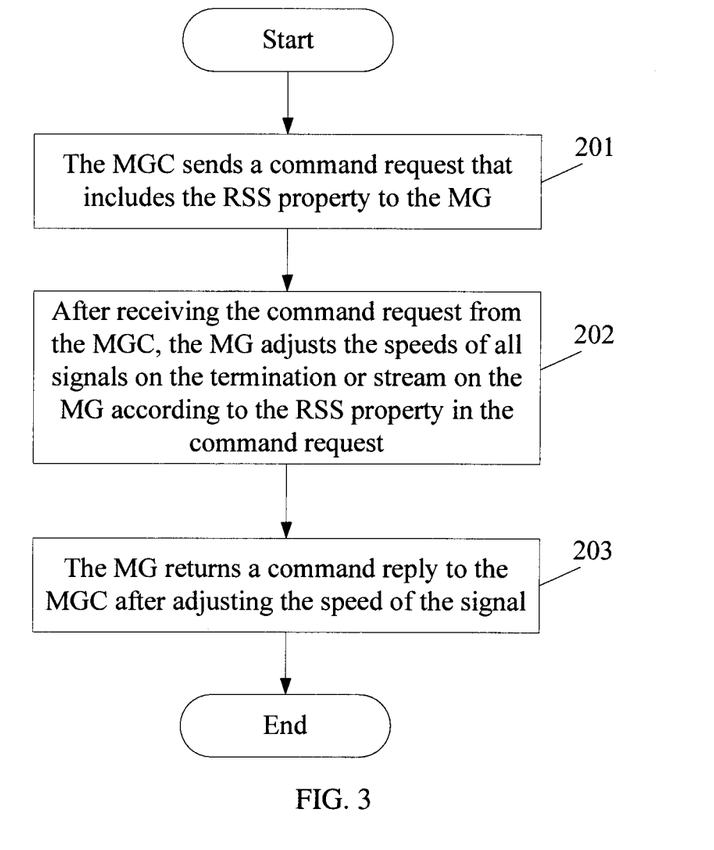
FIG. 3 is a flowchart of a method for adjusting the signal speed in a second embodiment of the present invention.

As shown in FIG. 3, a method for adjusting the signal speed in an embodiment of the present invention includes the following steps:

Step 201: When the MGC needs to adjust the speed of a signal on the termination or stream on the MG, the MGC sends a command request that includes the RSS property to the MG. The MGC sends the scale of the speed of the signal that the MGC requests to adjust to the regular speed to the MG through the RSS property.

Step 202: After receiving the command request from the MGC, the MG adjusts the speeds of all signals on the termination or stream on the MG according to the RSS property in the command request.

Step 203: The MG returns a command reply to the MGC after adjusting the speed of the signal.

The command reply also includes the RSS property through which the MG reports the scale of the actual speed of after the signal adjustment to the regular speed to the MGC.

Further, if the MGC does not care about the actual speed after the signal adjustment, the MG may not return a command reply to the MGC, that is, step 203 may be omitted, or the MG does not need to add the RSS property to the command reply returned to the MGC.

In this embodiment, the RSS property is introduced in the media gateway control protocol; when the MGC needs to adjust the speeds of all the signals on a termination or a stream on the MG, the MGC sends a command request that includes the RSS property to the MG. Thus, the signal speed may be adjusted easily and efficiently, meeting the real-time adjustment requirement.

Third Embodiment

Figure 4:
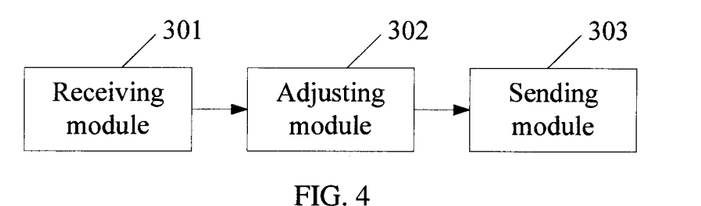
FIG. 4 shows a structure of an MG in a third embodiment of the present invention.

As shown in FIG. 4, an MG provided an embodiment of the present invention includes:

a receiving module 301, adapted to receive a command request that includes signal speed adjustment information from an MGC; and an adjusting module 302, adapted to adjust the signal speed according to the signal speed adjustment information included in the command request received by the receiving module 301.

The MG may further include:

a sending module 303, adapted to return a command reply that includes an adjustment execution error or signal speed adjustment information to the MGC, where the signal speed adjustment information includes the scale of the actual speed after the signal adjustment by the MG to the regular speed.

In this embodiment, the adjusting module 302 adjusts the speed of a signal or a group of signals on the MG according to the signal speed adjustment information in the command request received by the receiving module 301. In this way, the speed of any signal may be adjusted, thus solving the problem that only the speed of the playing signal can be adjusted in the prior art.

Fourth Embodiment

Figure 5:
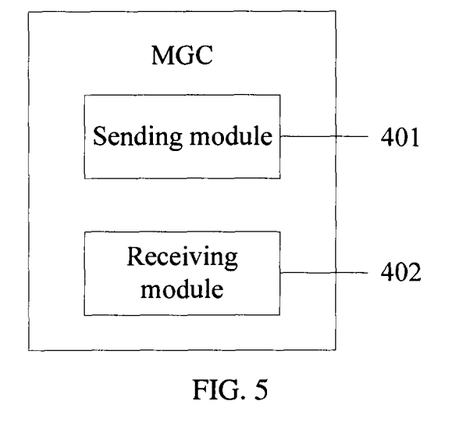
FIG. 5 shows a structure of an MGC in a fourth embodiment of the present invention.

As shown in FIG. 5, an MGC provided an embodiment of the present invention includes:

a sending module 401, adapted to send a command request that includes signal speed adjustment information to an MG.

The sending module 401 may be further adapted to send a command request that includes a signal whose speed needs to be adjusted to the MG.

The MGC may further include:

a receiving module 402, adapted to receive a command reply that includes an adjustment execution error or signal speed adjustment information from the MG, where the signal speed adjustment information includes the scale of the actual speed after the signal adjustment by the MG to the regular speed.

In this embodiment, the sending module 401 sends a command request that includes the signal speed adjustment information to the MG. In this way, the speed of any signal may be easily adjusted.

Embodiments of the present invention may be implemented by software. The software may be stored in a readable storage medium, such as a hard disk, a floppy disk or a compact disk in a personal computer.

Although the present invention has been described through several exemplary embodiments and accompanying drawings, the invention is not limited to such embodiments. It is apparent that those skilled in the art can make various modifications, equivalent replacements, and improvements to the invention without departing from the scope of the invention. The modifications, equivalent replacements, and improvements should fall within the scope of protection of the present invention.

What is claimed is:

1. In a Media Gateway (MG) of a packet network, a method for adjusting execution duration of one or more resource operations, the method comprising:

receiving a command request from a Media Gateway Controller (MGC), which includes a relative speed signal for adjusting execution duration of one or more resource operations on a termination or a stream of the MG, wherein the relative speed signal includes a scaling factor indicating a scale of execution duration and a media resource identifier (MRI);

determining one or more resource operations associated with a media resource corresponding to the MRI on the termination or the stream; and adjusting the execution duration of the one or more resource operations associated with the media resource according to the scaling factor.

2. The method of claim 1, wherein the relative speed signal further comprises a signal identifier indicating a ID of a resource operation; the method further comprises: adjusting the execution duration of the resource operations identified by the signal identifier according to the scaling factor.

3. The method of claim 1, further comprising:

returning a command reply that comprises signal speed adjustment information to the MGC, wherein the signal speed adjustment information comprises a scale parameter indicating the adjusted actual execution duration of the one or more resource operations.

4. The method of claim 1, wherein the MRI is a string in the format of uniform resource identifier (URI) or internationalized resource identifier (IRI).

5. A non-transitory computer program product for use in a Media Gateway (MG) of a packet network, wherein the computer program product further includes computer executable instructions stored on one or more non-transitory computer readable media, or a combination thereof, such that when a processor associated with the MG executes said computer instructions it causes the MG to perform the following:

receiving a command request from a Media Gateway Controller (MGC), which includes a relative speed signal for adjusting execution duration of one or more resource operations on a termination or a stream of the MG, wherein the relative speed signal includes a scaling factor indicating a scale of execution duration and a media resource identifier (MRI);

determining one or more resource operations associated with a media resource corresponding to the MRI on the termination or the stream; and adjusting the execution duration of the one or more resource operations associated with the media resource according to the scaling factor.

6. The computer program product of claim 5, wherein the relative speed signal further comprises a signal identifier indicating a ID of a resource operation; and further comprises: adjusting the execution duration of the resource operations identified by the signal identifier according to the scaling factor.

7. The computer program product of claim 5 further comprises return a command reply that comprises signal speed adjustment information to the MGC, wherein the signal speed adjustment information comprises a scale parameter indicating the adjusted actual execution duration of the one or more resource operations.

8. The computer program product of claim 5, wherein the MRI is a string in the format of uniform resource identifier (URI) or internationalized resource identifier (IRI).

\* \* \* \* \*